US008602607B2

(12) United States Patent
Arik et al.

(10) Patent No.: US 8,602,607 B2
(45) Date of Patent: Dec. 10, 2013

(54) LIGHTING SYSTEM WITH THERMAL MANAGEMENT SYSTEM HAVING POINT CONTACT SYNTHETIC JETS

(75) Inventors: Mehmet Arik, Niskayuna, NY (US); Stanton Earl Weaver, Niskayuna, NY (US); Glenn Howard Kuenzler, East Cleveland, OH (US); Charles Franklin Wolfe, Jr., Niskayuna, NY (US); Rajdeep Sharma, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 261 days.

(21) Appl. No.: 12/908,948

(22) Filed: Oct. 21, 2010

(65) Prior Publication Data

US 2012/0098424 A1 Apr. 26, 2012

(51) Int. Cl.
*B60Q 1/06* (2006.01)

(52) U.S. Cl.
USPC .......................................... 362/373; 362/294

(58) Field of Classification Search
USPC ................................................ 362/294, 373
See application file for complete search history.

(56) References Cited

U.S. PATENT DOCUMENTS

| | | | | |
|---|---|---|---|---|
| 5,758,823 | A | 6/1998 | Glezer et al. | |
| 6,109,222 | A | 8/2000 | Glezer et al. | |
| 6,247,525 | B1 | 6/2001 | Smith et al. | |
| 6,412,732 | B1 | 7/2002 | Amitay et al. | |
| 6,588,497 | B1 | 7/2003 | Glezer et al. | |
| 6,644,598 | B2 | 11/2003 | Glezer et al. | |
| 7,144,140 | B2 * | 12/2006 | Sun et al. | 362/373 |
| 7,204,615 | B2 | 4/2007 | Arik et al. | |
| 7,252,140 | B2 | 8/2007 | Glezer et al. | |
| 7,483,770 | B2 | 1/2009 | Meinders et al. | |
| 7,543,961 | B2 | 6/2009 | Arik et al. | |
| 7,556,406 | B2 | 7/2009 | Petroski et al. | |
| 7,606,029 | B2 | 10/2009 | Mahalingam et al. | |
| 7,607,470 | B2 | 10/2009 | Glezer et al. | |
| 2005/0174780 | A1 * | 8/2005 | Park | 362/294 |
| 2006/0060331 | A1 | 3/2006 | Glezer et al. | |
| 2006/0185822 | A1 | 8/2006 | Glezer et al. | |
| 2006/0196638 | A1 | 9/2006 | Glezer et al. | |
| 2007/0023169 | A1 | 2/2007 | Mahalingam et al. | |
| 2007/0081027 | A1 | 4/2007 | Beltran et al. | |
| 2007/0095987 | A1 | 5/2007 | Glezer et al. | |
| 2007/0096118 | A1 | 5/2007 | Mahalingam et al. | |

(Continued)

FOREIGN PATENT DOCUMENTS

| | | |
|---|---|---|
| DE | 102009020817 | 11/2009 |
| EP | 1040736 | 2/2007 |

(Continued)

OTHER PUBLICATIONS

Search Report and Written Opinion from corresponding PCT Application No. PCT/US2011/045460 dated Feb. 6, 2012.

*Primary Examiner* — Julie Shallenberger
(74) *Attorney, Agent, or Firm* — Mary Louise Stanford

(57) ABSTRACT

Lighting systems having unique configurations are provided. For instance, the lighting system may include a light source, a thermal management system and driver electronics, each contained within a housing structure. The light source is configured to provide illumination visible through an opening in the housing structure. The thermal management system includes a plurality of synthetic jets. The synthetic jets are arranged within the lighting system such that they are secured at contact points.

27 Claims, 5 Drawing Sheets

(56) References Cited

U.S. PATENT DOCUMENTS

| | | | | |
|---|---|---|---|---|
| 2007/0119573 | A1 | 5/2007 | Mahalingam et al. | |
| 2007/0139938 | A1* | 6/2007 | Petroski et al. | 362/373 |
| 2007/0141453 | A1 | 6/2007 | Mahalingam et al. | |
| 2007/0267976 | A1 | 11/2007 | Bohler et al. | |
| 2007/0272393 | A1 | 11/2007 | Reichenbach et al. | |
| 2008/0006393 | A1 | 1/2008 | Grimm | |
| 2008/0009187 | A1* | 1/2008 | Grimm et al. | 439/595 |
| 2008/0043061 | A1 | 2/2008 | Glezer et al. | |
| 2008/0062644 | A1 | 3/2008 | Petroski | |
| 2008/0151541 | A1 | 6/2008 | Heffington et al. | |
| 2008/0219007 | A1 | 9/2008 | Heffington et al. | |
| 2008/0295997 | A1 | 12/2008 | Heffington et al. | |
| 2009/0001372 | A1 | 1/2009 | Arik et al. | |
| 2009/0031475 | A1* | 2/2009 | Ochoa et al. | 2/171.3 |
| 2009/0084866 | A1 | 4/2009 | Grimm et al. | |
| 2009/0109625 | A1 | 4/2009 | Booth et al. | |
| 2009/0141065 | A1 | 6/2009 | Darbin et al. | |
| 2009/0168343 | A1 | 7/2009 | Aarts et al. | |
| 2010/0012301 | A1 | 1/2010 | Aarts | |
| 2010/0014839 | A1 | 1/2010 | Benoy et al. | |
| 2010/0018675 | A1 | 1/2010 | Aarts et al. | |
| 2010/0033071 | A1 | 2/2010 | Heffington et al. | |
| 2010/0039012 | A1 | 2/2010 | Grimm | |
| 2010/0124058 | A1 | 5/2010 | Miller | |
| 2011/0162823 | A1* | 7/2011 | Sharma et al. | 165/104.34 |

FOREIGN PATENT DOCUMENTS

| | | |
|---|---|---|
| EP | 1975505 | 10/2008 |
| WO | WO2008048493 | 4/2008 |
| WO | WO2008152560 | 12/2008 |
| WO | WO2009040703 | 4/2009 |
| WO | WO2009072046 | 6/2009 |
| WO | WO2010004469 | 1/2010 |
| WO | WO2010010495 | 1/2010 |

* cited by examiner

LIGHTING SYSTEM WITH THERMAL MANAGEMENT SYSTEM HAVING POINT CONTACT SYNTHETIC JETS

STATEMENT REGARDING FEDERALLY SPONSORED RESEARCH & DEVELOPMENT

This invention was made with Government support under contract number DE-FC26-08NT01579 awarded by The United States Department of Energy. The Government has certain rights in the invention.

BACKGROUND OF THE INVENTION

The invention relates generally to lighting systems, and more particularly to lighting systems having thermal management systems.

High efficiency lighting systems are continually being developed to compete with traditional area lighting sources, such as incandescent or florescent lighting. While light emitting diodes (LEDs) have traditionally been implemented in signage applications, advances in LED technology have fueled interest in using such technology in general area lighting applications. LEDs and organic LEDs are solid-state semiconductor devices that convert electrical energy into light. While LEDs implement inorganic semiconductor layers to convert electrical energy into light, organic LEDs (OLEDs) implement organic semiconductor layers to convert electrical energy into light. Significant developments have been made in providing general area lighting implementing LEDs and OLEDs.

One potential drawback in LED applications is that during usage, a significant portion of the electricity in the LEDs is converted into heat, rather than light. If the heat is not effectively removed from an LED lighting system, the LEDs will run at high temperatures, thereby lowering the efficiency and reducing the reliability of the LED lighting system. In order to utilize LEDs in general area lighting applications where a desired brightness is required, thermal management systems to actively cool the LEDs may be considered. Providing an LED-based general area lighting system that is compact, lightweight, efficient, and bright enough for general area lighting applications is challenging. While introducing a thermal management system to control the heat generated by the LEDs may be beneficial, the thermal management system itself also introduces a number of additional design challenges.

BRIEF DESCRIPTION OF THE INVENTION

In one embodiment, a lighting system is provided. The lighting system, comprises a housing structure and a light source configured to provide illumination visible through an opening in the housing structure. The lighting system further comprises a thermal management system configured to cool the lighting system and comprising a plurality of synthetic jet devices secured within the housing structure by a plurality of contact points. The lighting system further comprises driver electronics configured to provide power to each of the light source and the thermal management system.

In another embodiment, a lighting system comprising an array of light emitting diodes and a thermal management system is provided. The array of light emitting diodes (LEDs) is arranged on a surface of a lighting plate. The thermal management system is arranged above the array of LEDs, and comprises a heat sink having a base and a plurality of fins extending therefrom and a plurality of synthetic jets. Each of the plurality of synthetic jet devices is arranged to produce a jet stream between a respective pair of the plurality of fins, wherein the plurality of synthetic jet devices are coupled to the lighting system at a plurality of contact points.

In another embodiment, there is provided a lighting system, comprising a light source, a housing structure and a plurality of synthetic jet structures. The housing structure comprises a plurality of slots. Each of the plurality of synthetic jet devices is configured to engage at least one of the plurality of slots.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
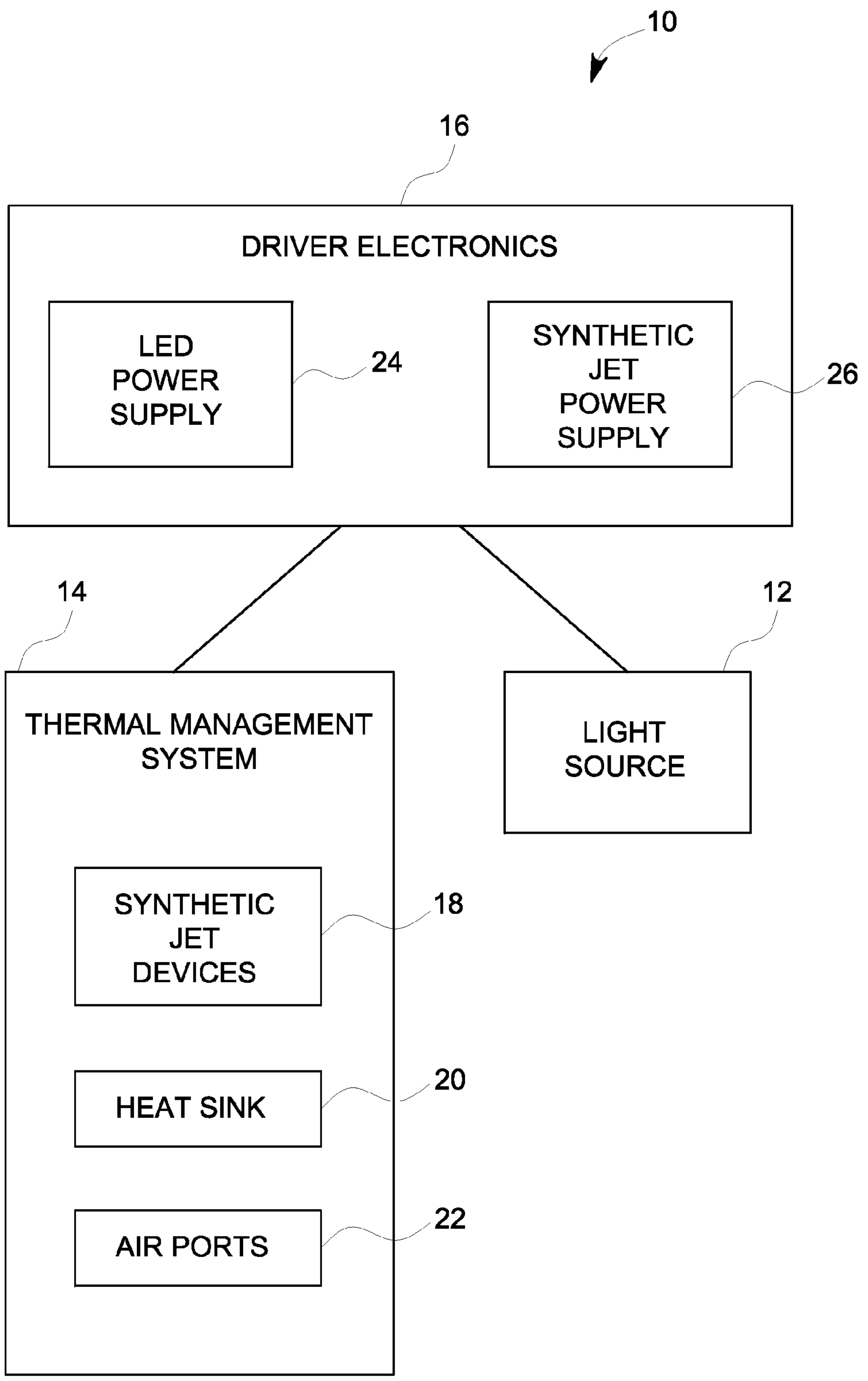
FIG. 1 is block diagram of a lighting system in accordance with an embodiment of the invention.

Embodiments of the invention generally relate to LED-based area lighting systems. A lighting system is provided with driver electronics, LED light source and an active cooling system, which includes synthetic jets arranged and secured into the system in a manner which optimizes actuation of the synthetic jets and air flow through thereby providing a more efficient lighting system than previous designs. In one embodiment, the lighting system fits into a standard 6" (15.2 cm) halo and leaves approximately 0.5" (1.3 cm) between the lamp and halo. Alternatively, the lighting system may be scaled differently, depending on the application. The presently described embodiments provide a lighting source, which produces approximately 1500 lumens (lm) with a driver electronics efficiency of 90%, and may be useful in area lighting applications. The thermal management system includes synthetic jet cooling which provides an air flow in and out of the lighting system, allowing LED junction temperatures to remain less than 100° C. for the disclosed embodiments.

Advantageously, in one embodiment, the lighting system uses a conventional screw-in base (i.e., Edison base) that is connected to the electrical grid. The electrical power is appropriately supplied to the thermal management system and to the light source by the same driver electronics unit. In one embodiment, the LEDs of the light source are driven at 500 mA and 59.5 V while the synthetic jets of the thermal management system are driven with less than 200 Hz and 120 V (peak-to-peak). The LEDs provide a total of over 1500 steady state face lumens, which is sufficient for general area lighting applications. In the illustrated embodiments described below, synthetic jet devices are provided to work in conjunction with a heat sink having a plurality of fins, and air ports, to both actively and passively cool the LEDs. As will be described, the synthetic jet devices are excited with a desired power level to provide adequate cooling during illumination of the LEDs.

As described further below, the synthetic jets are arranged vertically with regard to the lighting surface. The synthetic jets are arranged parallel to one another and are configured to provide sufficient air flow to cool the light source. The synthetic jets are arranged to provide air flow across fins of a heat sink. In order to provide increased airflow, while minimizing vibrations transferred to the housing of the lighting system, a unique packaging configuration of the synthetic jets is provided. In accordance with embodiments disclosed herein, the synthetic jets are secured to housing structures of the lighting system by a contact point attachment technique.

As used herein, "contact point attachment" refers to securing an object, here a synthetic jet device, to a structure, here a housing structure, at multiple points of engagement along a periphery of the object. Each point of engagement encompasses a limited length along the periphery. As used herein, the term "point" connotes a discrete area of contact that is minimized when compared to the periphery of the object, as a whole. For instance, each "contact point" wherein a portion of the periphery of the synthetic jet is secured to the structure, holds the object along a length that is less than 10% of the total length of the periphery. More specifically, for a circular synthetic jet, the periphery of the synthetic jet is engaged at each contact point for a length that is less than 10% of the circumference of the synthetic jet device. Thus, as used herein, the term "contact point" refers to a region of contact that is less than 10% of the circumference of the synthetic jet device. In contrast, a securing mechanism that contacts and holds a synthetic jet device at a single contact region that is greater than 10% of the circumference (or total length of the periphery for a non-circular device) is not considered a "contact point," but rather would be an entire contact region, or the like. In one embodiment, each synthetic jet is held in place at three contact points. By securing each synthetic jet utilizing a point contact configuration, rather than clamping large peripheral areas of the synthetic jet, movement of the synthetic jet is not unnecessarily restrained, thereby allowing maximization of membrane deflection, and thus increased air flow. Further, point contacts provide minimal vibration transfer from the synthetic jet to the housing of the lighting system, which is generally desirable. Because the disclosed embodiments provide at least three contact points for securing each of the synthetic jets within the lighting system, mechanical stability of the synthetic jets is not compromised.

Referring now to FIG. 1, a block diagram illustrating a lighting system 10 in accordance with embodiments of the present invention is illustrated. In one embodiment, the lighting system 10 may be a high-efficiency solid-state down-light luminaire. In general, the lighting system 10 includes a light source 12, a thermal management system 14, and driver electronics 16 configured to drive each of the light source 12 and the thermal management system 14. As discussed further below, the light source 12 includes a number of LEDs arranged to provide down-light illumination suitable for general area lighting. In one embodiment, the light source 12 may be capable of producing at least approximately 1500 face lumens at 75 lm/W, CRI>80, CCT=2700 k-3200 k, 50,000 hour lifetime at a 100° C. LED junction temperature. Further, the light source 12 may include color sensing and feedback, as well as being angle control.

As will also be described further below, the thermal management system 14 is configured to cool the LEDs such that the LED junction temperatures remain at less than 100° C. under normal operating conditions. In one embodiment, the thermal management system 14 includes synthetic jet devices 18, heat sinks 20 and air ports 22 which are configured to work in conjunction to provide the desired cooling and air exchange for the lighting system 10. As will be described further below, the synthetic jet devices 18 are arranged and secured utilizing a point attachment technique which advantageously maximizes air flow production and synthetic jet stability, while minimizing vibration transfer to the housing of the lighting system 10.

The driver electronics 16 include an LED power supply 24 and a synthetic jet power supply 26. In accordance with one embodiment, the LED power supply 24 and the synthetic jet power supply 26 each comprise a number of chips and integrated circuits residing on the same system board, such as a printed circuit board (PCB), wherein the system board for the driver electronics 16 is configured to drive the light source 12, as well as the thermal management system 14. By utilizing the same system board for both the LED power supply 24 and the synthetic jet power supply 26, the size of the lighting system 10 may be advantageously minimized. In an alternate embodiment, the LED power supply 24 and the synthetic jet power supply 26 may each be distributed on independent boards.

Figure 2:
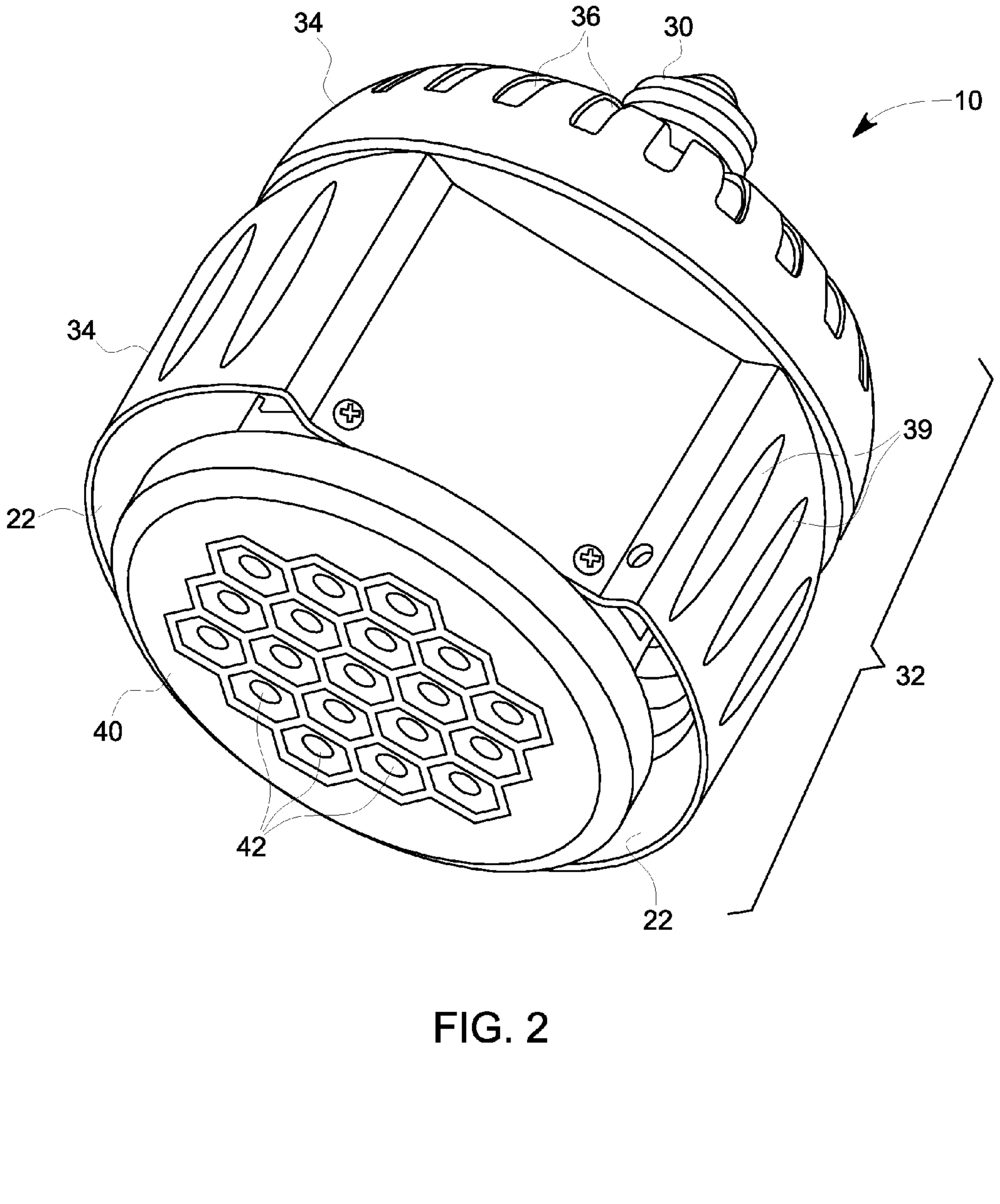
FIG. 2 illustrates a perspective view of a lighting system, in accordance with an embodiment of the invention.

Referring now to FIG. 2, a perspective view of one embodiment of the lighting system 10 is illustrated. In one embodiment, the lighting system 10 includes a conventional screw-in base (Edison base) 30 that may be connected to a conventional socket that is coupled to the electrical power grid. The system components are contained within a housing structure generally referred to as a housing structure 32. As will be described and illustrated further with regard to FIG. 3, the housing structure 32 is configured to support and protect the internal portion of the light source 12, the thermal management system 14, and the driver electronics 16.

In one embodiment, the housing structure 32 includes a cage 34, having air slots 36 there through. The cage 34 is configured to protect the electronics board having the driver electronics 16 disposed thereon. The housing structure 32 further includes a thermal management system housing 38 to protect the components of the thermal management system 14. The thermal management system housing 38 many include air slots 39. In accordance with one embodiment, the thermal management system housing 38 is shaped such that air ports 22 allow ambient air to flow in and out of the lighting system 10 by virtue of synthetic jets in the thermal management system 14, as described further below. Further, the housing structure 32 includes a faceplate 40 configured to support and protect the light source 12. As will be described and illustrated in FIG. 3, the faceplate 40 includes an opening which is sized and shaped to allow the faces of the LEDs 42 and/or optics, of the light source 12, to be exposed at the underside of the lighting system 10 such that when illuminated, the LEDs 42 provide general area down-lighting. In an alternative embodiment illustrated and described with reference to FIG. 4, the housing structure may also include a trim piece surrounding the faceplate 40 to provide further heat transfer to cool the lighting system 10, as well as provide certain ornamental attributes. As further illustrated in the embodiment described with reference to FIG. 4 below, the shape of the thermal management system housing 38 may vary.

Figure 3:
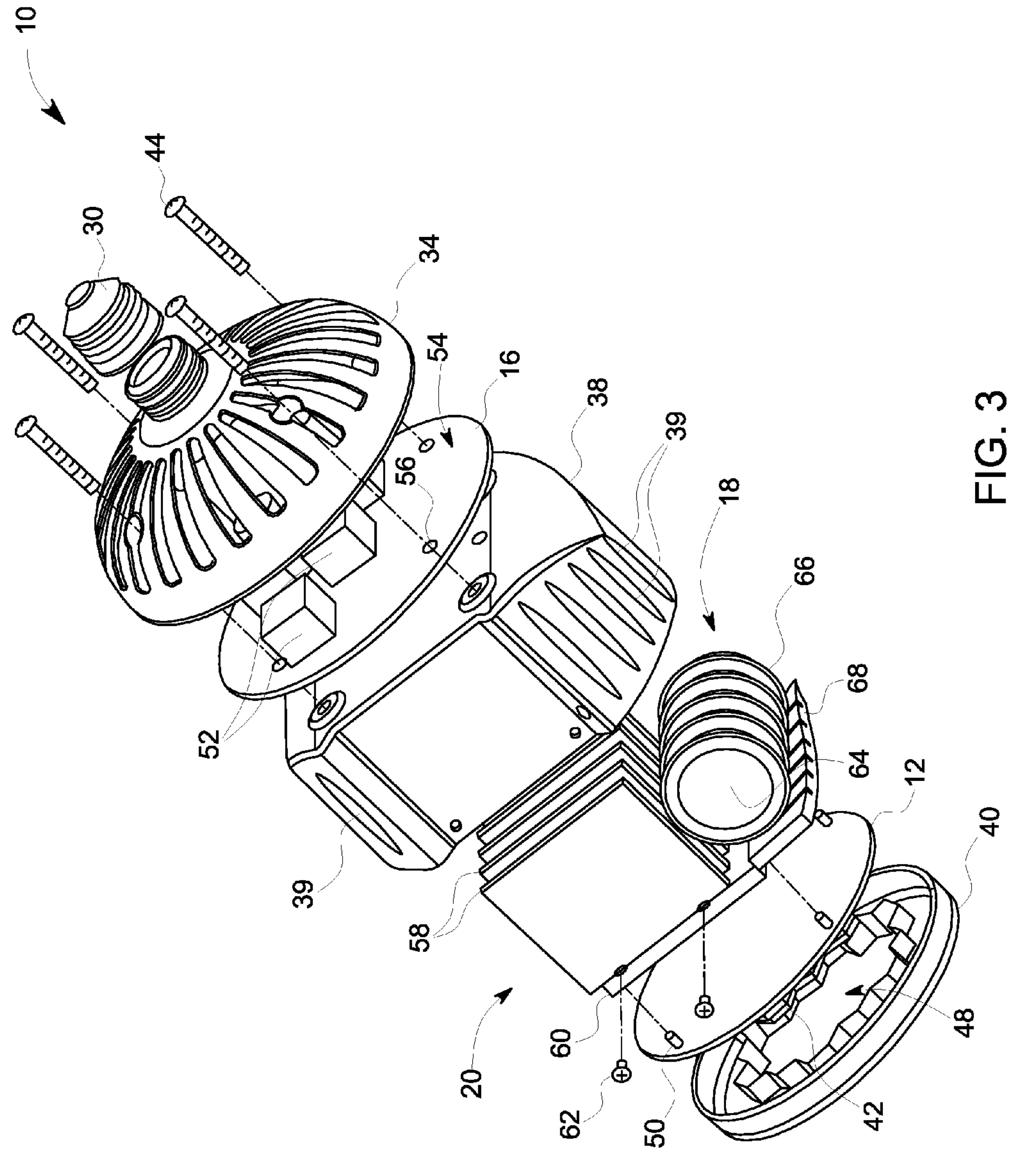
FIG. 3 illustrates an exploded view of the lighting system of FIG. 2, in accordance with an embodiment of the invention.

Turning now to FIG. 3, an exploded view of the lighting system 10 is illustrated. As previously described and illustrated, the lighting system 10 includes a housing structure 32 which includes the cage 34, the thermal management system housing 38, and the faceplate 40. When assembled, the housing structure 32 is secured by screws 44 configured to engage the cage 34, the thermal management system housing 38, and a holding mechanism such as a plurality of nuts (not shown). In one embodiment, the faceplate 40 is sized and shaped to frictionally engage a base of the lighting system 10, and/or secured by another fastening mechanism such as additional screws (not shown). An opening 48 in the faceplate 40 is sized and shaped such that the LEDs 42 positioned on the underside of the light source 12 may be visible to the opening 48. The light source 12 may also include fastening components, such as pins 50 configured engage an underside of the thermal management system 14. As will be appreciated, any variety of fastening mechanisms may be included to secure the components of the lighting system 10, within the housing structure 32, such that the lighting system 10 is a single unit, once assembled for use.

As previously described, the driver electronics 16 which are housed within the cage 34 include a number of integrated circuit components 52 mounted on a single board, such as a printed circuit board (PCB) 54. As will be appreciated, the PCB 54 having components mounted thereto, such as the integrated circuit components 52, forms a printed circuit assembly (PCA). Conveniently, the PCB 54 is sized and shaped to fit within the protective cage 34. Further, the PCB 54 includes through-holes 56 configured to receive the screws 44 such that the driver electronics 16, the thermal management system housing 38, and the cage 34 are mechanically coupled together. In accordance with the illustrated embodiment, all of the electronics configured to provide power for the light source 12, as well as the thermal management system 14 are contained on a single PCB 54, which is positioned above the thermal management system 14 and light source 12. Thus, in accordance with the present design, the light source 12 and the thermal management system 14 share the same input power.

In the illustrated embodiment, the thermal management system 14 includes a heat sink 20 having a number of fins 58 coupled to a base 60 via screws 62. As will be appreciated, the heat sink 20 provides a heat-conducting path for the heat produced by the LEDs 42 to be dissipated. The base 60 of the heat sink 20 is arranged to rest against the backside of the light source 12, such that heat from the LEDs 42 may be transferred to the base 60 of the heat sink 20. The fins 58 extend perpendicularly from the base 60, and are arranged to run parallel to one another.

The thermal management system 14 further includes a number of synthetic jet devices 18 which are arranged adjacent to the fins 58 of the heat sink 20. As will be appreciated, each synthetic jet device 18 is configured to provide a synthetic jet flow across the faceplate 40 and between the fins 58 to provide further cooling of the LEDs 48. Each synthetic jet device 18 includes a diaphragm 64 which is configured to be driven by the synthetic jet power supply 26 such that the diaphragm 64 moves rapidly back and forth within a hollow frame 66 to create an air jet through an opening in the frame 66 which will be directed through the gaps between the fins 58 of the heat sink 20.

As will be described in greater detail with regard to FIG. 4, the thermal management system housing 38 includes molded slots within the housing structure that are configured to engage the synthetic jet devices 18 at two contact points. By providing molded slots in the thermal management system housing 38, the synthetic jet devices 18 may be accurately positioned within the housing 38. To further secure the synthetic jet devices 18 within the thermal management system housing 38, a bridge 68 may be provided. The bridge 68 is configured to engage each synthetic jet device 18 at one contact point. Accordingly, in the present embodiment, once assembled, each synthetic jet device 18 is secured within the lighting system 10 at three contact points.

The thermal management system 14 and the unidirectional airflow created by these synthetic jet devices 18 will be described further below with respect to FIG. 4. It should be noted that while the thermal management system housing 38 of FIG. 3 includes bowed sides that extend beyond the edges of the cage 34 to provide increased openings for the air flow through the ducts 22, in certain embodiments, such a bowed design may be eliminated. For instance, as will be illustrated with reference to FIG. 4, the size of the ducts 22 may be reduced such that sides of the thermal management system housing 38 extend linearly from the edge of the cage 34 to provide a uniform structure. The slots 39 may be designed to provide sufficient air flow through the lighting system 10 to allow a reduction in the size of the ducts 22.

Figure 4:
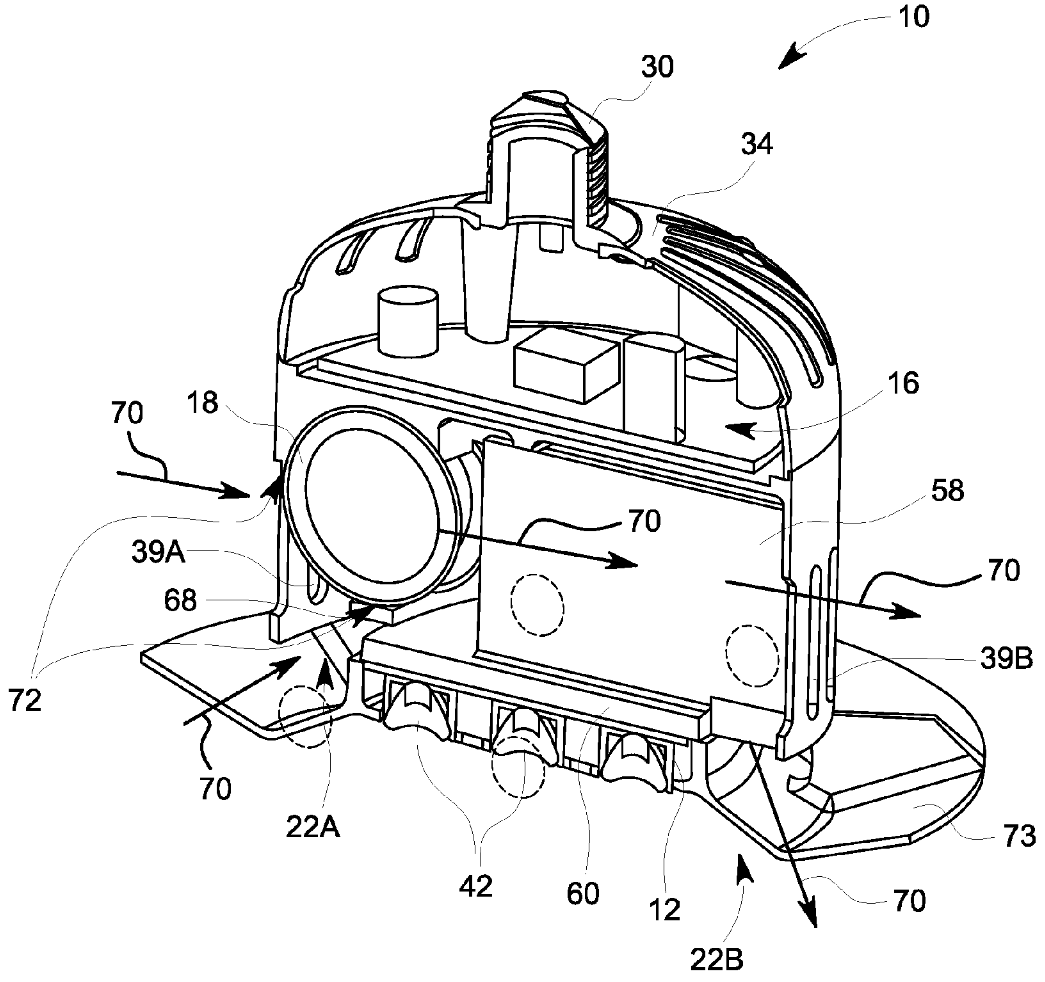
FIG. 4 illustrates a cross-sectional view of a portion of a thermal management system of a lighting system, in accordance with an embodiment of the invention.

Referring now to FIG. 4, a partial cross-sectional view of the lighting system 10 is provided to illustrate certain details of the thermal management system 14, as well as to illustrate the alternative embodiment of the thermal management system housing 38 described above. As previously discussed, the thermal management system 14 includes synthetic jet devices 18, heat sink 20, air ports 22, and slots 39 in the thermal management system housing 38. The base 60 of the heat sink 20 is arranged in contact with the underlying light source 12, such that heat can be passively transferred from the LEDs 42 to the heat sink 20. The array of synthetic jet devices 18 is arranged to actively assist in the linear transfer of heat transfer, along the fins 58 of the heat sink 20. In the illustrated embodiment, each synthetic jet device 18 is positioned between the recesses provided by the gaps between the parallel fins 58, such that the air stream created by each synthetic jet device 18 flows through the gaps between the parallel fins 58. The synthetic jet devices 18 can be powered to create a unidirectional flow of air through the heat sink 20, between the fins 58, such that air from the surrounding area is entrained into the duct through one of the ports 22A and the slots 39A on one side of the thermal management system housing 38 and warm air from the heat sink 20 is ejected into the ambient air through the other port 22B and slots 39B on the other side of the thermal management system housing 38. The unidirectional airflow into the port 22A and slots 39A, through the fin gaps, and out the port 22B and slots 39B is generally indicated by airflow arrows 70. Advantageously, the unidirectional air flow 70 prevents heat buildup within the lighting system 10, which is a leading cause for concern in the design of thermal management of down-light systems. In alternative embodiments, the air flow created by the synthetic jet devices 18 may be radial or impinging, for instance. In addition, the thermal management system may further include a trim plate 73. The trim plate 73 may be conductive and may be directly coupled to the heat sink 20 to provide further heat transfer from the lighting system 10, radially into the ambient air. The presently described thermal management system 14 is capable of providing an LED junction temperature of less than 100° C. at approximately 30 W of heat generation.

As will be appreciated, synthetic jets, such as the synthetic jet devices 18, are zero-net-massflow devices that include a cavity or volume of air enclosed by a flexible structure and a small orifice through which air can pass. The structure is induced to deform in a periodic manner causing a corresponding suction and expulsion of the air through the orifice. The synthetic jet device 18 imparts a net positive momentum to its external fluid, here ambient air. During each cycle, this momentum is manifested as a self-convecting vortex dipole that emanates away from the jet orifice. The vortex dipole then impinges on the surface to be cooled, here the underlying light source 12, disturbing the boundary layer and convecting the heat away from its source. Over steady state conditions, this impingement mechanism develops circulation patterns near the heated component and facilitates mixing between the hot air and ambient fluid.

In accordance with one embodiment, each synthetic jet devices 18 has two piezoelectric disks, excited out of phase and separated by a thin compliant wall with an orifice. This particular design has demonstrated substantial cooling enhancement, during testing. It is important to note that the synthetic jet operating conditions should be chosen to be practical within lighting applications. The piezoelectric components are similar to piezoelectric buzzer elements. The cooling performance and operating characteristics of the synthetic jet device 18 are due to the interaction between several physical domains including electromechanical coupling in the piezoelectric material used for actuation, structural dynamics for the mechanical response of the flexible disks to the piezoelectric actuation, and fluid dynamics and heat transfer for the jet of air flow 70. Sophisticated finite element (FE) and computational fluid dynamics (CFD) software programs are often used to simulate the coupled physics for synthetic jet design and optimization.

The package that holds the synthetic jet device 18 within the lighting system 10 should orient the synthetic jet devices 18 for maximum cooling effectiveness without mechanically constraining the motion of the synthetic jet. Advantageously, the synthetic jet devices 18 are secured within the lighting system 10 utilizing contact point attachment techniques. As will be more clearly illustrated with reference to FIG. 5, each synthetic jet device 18 is held in place by contact points 72. In the illustrated embodiments, there are three contact points at which the synthetic jet device 18 is secured to a structure of the lighting system, such as the thermal management system housing 38 or the bridge 68. By minimizing the contact area, the synthetic jet devices are not unnecessarily restrained within the lighting system 10.

Figure 5:
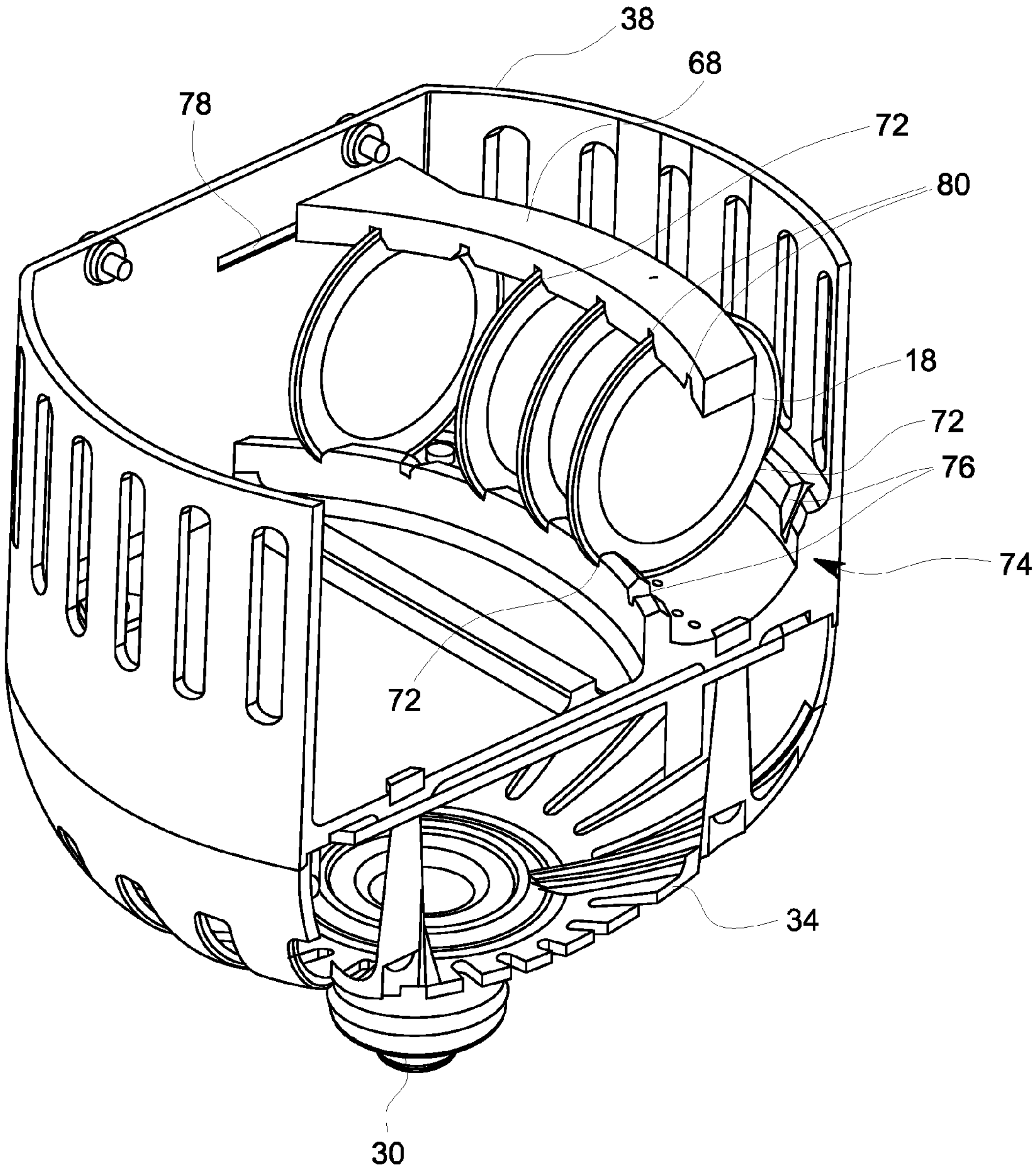
FIG. 5 illustrates a perspective view of the light source illustrating packaging details of a portion of the thermal management system, in accordance with an embodiment of the invention.

Referring now to FIG. 5, a schematic view of a portion of the lighting system 10 is shown to illustrate the contact point attachment techniques used to secure the synthetic jet devices 18 within the lighting system 10, in accordance with embodiments of the invention. As illustrated, the thermal management system housing 38 includes a base bracket 74. In the illustrated embodiment, the base bracket 74 is a molded portion of the thermal management system housing 38. However, in alternative embodiments, the base bracket 74 may be a separate piece. The base bracket 74 includes base slots 76 configured to securely receive the synthetic jet devices 18. Specifically, the base bracket 74 includes two base slots 76 to engage each synthetic jet device 18. In the illustrated embodiment, the base bracket 74 is configured to receive six synthetic jet devices 18. During assembly, the synthetic jet devices 18 may be slid into the base slots 76. In one embodiment, the base slots 76 have tapered edges to help guide the synthetic jet device 18 into place. The base slots 76 are only slightly wider than the thickness of the synthetic jet devices 18, at the base of each base slot 76. Further, the base slots are just deep enough to restrain the synthetic jet device 18 in place, without affecting the ability of the synthetic jet device to be fully actuated. Advantageously, because each of the base slots 76 is molded into the base bracket 74, which may in turn be molded into the thermal management system housing 38, as illustrated, the positioning of each respective synthetic jet device 18 is precisely defined with respect to the heat sink 20 to provide maximum cooling.

Once the synthetic jet devices 18 are positioned within the base slots 76, the bridge 68 may be snapped into a slot 78 in the housing 38. As will be appreciated, the bridge 68 includes a snapping mechanism (not illustrated) to allow the bridge to be mechanically coupled to the housing 38. The bridge 68 includes a number of bridge slots 80. Each bridge slot 80 is tapered and positioned to engage a synthetic jet device 18 at a third contact point 72. Accordingly, the bridge 68 provides a locking mechanism to securely hold each synthetic jet device 18 within the lighting system 10, such that vibration during actuation, or other movement of the lighting system 10 will not loosen the synthetic jet devices 18. Advantageously, the bridge 68 is a single structure utilized to hold the entire set of synthetic jet devices 68 in place. Using a single piece of material for the bridge 68 provides a simple, repeatable, robust, easily manufacturable and cost effective way of securing the synthetic jet devices 18 to the base bracket 74. Further, by utilizing a contact point attachment technique, as described herein, provides improved cooling efficiency, without requiring additional driving power and without significant increase in noise.

Additionally, a soft gel such as silicone (not shown) may be applied to each of the three contact points 72 to reduce vibrational noise and to further affix each synthetic jet device 18 within the lighting system 10, such that the synthetic jet devices 18 do not rotate within the slots 76 and 80. Further, by using a mounting gel in conjunction with the slotted base bracket 74 and slotted bridge 68, the required holding force may be reduced.

This written description uses examples to disclose the invention, including the best mode, and also to enable any person skilled in the art to practice the invention, including making and using any devices or systems and performing any incorporated methods. Further details regarding the driver electronics and the light source may be found in U.S. patent application Ser. No. 12/711,000, entitled LIGHTING SYSTEM WITH THERMAL MANAGEMENT SYSTEM, which was filed on Feb. 23, 2010 and is assigned to General Electric Company, and is hereby incorporated by reference herein. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A lighting system, comprising:

a housing structure;

a light source configured to provide illumination visible through an opening in the housing structure;

a thermal management system configured to cool the lighting system and comprising a plurality of synthetic jet devices secured within the housing structure in a point contact configuration comprising a plurality of contact points;

the thermal management system further comprising a heat sink having a base portion and a plurality of fins extending therefrom; each of the plurality of synthetic jet devices being positioned between a pair of fins and configured to produce a unidirectional air flow through an air gap between the pair of fins; and driver electronics configured to provide power to each of the light source and the thermal management system.

2. The lighting system, as set forth in claim 1, wherein the light source comprises at least one light emitting diode (LED).

3. The lighting system, as set forth in claim 1, wherein the thermal management system comprises air ports to provide ingress and egress of ambient air through the lighting system when the plurality of synthetic jet devices is actuated.

4. The lighting system, as set forth in claim 1, wherein the thermal management system comprises slots in the housing structure to provide ingress and egress of ambient air through the lighting system when the plurality of synthetic jet devices is actuated.

5. The lighting system, as set forth in claim 1, comprising a base bracket configured to hold each of the plurality of synthetic jet devices at two respective contact points.

6. The lighting system, as set forth in claim 5, wherein the housing structure is a molded structure comprising the base bracket molded therein.

7. The lighting system, as set forth in claim 5, wherein each of the two contact points comprises a slot having tapered edges.

8. The lighting system, as set forth in claim 1, comprising a bridge configured to couple to the housing structure and further configured to hold each of the plurality of synthetic jet devices within the housing structure.

9. The lighting system, as set forth in claim 8, wherein the bridge comprises a plurality of slots each configured to hold a respective one of the plurality of synthetic jet devices.

10. The lighting system, as set forth in claim 9, wherein each of the plurality of slots comprises tapered edges.

11. The lighting system, as set forth in claim 1, wherein the driver electronics comprise a light emitting diode (LED) power supply and a synthetic jet power supply.

12. The lighting system, as set forth in claim 1, wherein the lighting system comprises a screw-based structure configured to electrically couple the lighting system to a standard socket.

13. The lighting system, as set forth in claim 1, wherein the lighting system is configured to produce at least approximately 1500 lumens.

14. The lighting system, as set forth in claim 1, wherein the plurality of synthetic jet devices are secured within the housing structure by three contact points.

15. A lighting system, comprising:

an array of light emitting diodes (LEDs) arranged on a surface of a lighting plate; and a thermal management system arranged above the array of LEDs, the thermal management system comprising:

a heat sink having a base and a plurality of fins extending therefrom; and a plurality of synthetic jet devices, wherein each of the plurality of synthetic jet devices is positioned between a pair of the plurality of fins and arranged to produce a unidirectional jet stream between said pair of the plurality of fins, wherein the plurality of synthetic jet devices are coupled to the lighting system in a point contact configuration comprising a plurality of contact points.

16. The lighting system, as set forth in claim 15, wherein the lighting system comprises a base bracket and a bridge configured to hold the plurality of synthetic jet devices therebetween.

17. The lighting system, as set forth in claim 16, wherein the base bracket comprises a plurality of slots, wherein each of the plurality of slot is configured to receive one of the plurality of synthetic jet devices.

18. The lighting system, as set forth in claim 16, wherein the bridge comprises a plurality of slots, wherein each of the plurality of slots is configured to receive one of the plurality of synthetic jet devices.

19. The lighting system, as set forth in claim 15, wherein the plurality of synthetic jet devices are coupled to the lighting system at three contact points.

20. The lighting system, as set forth in claim 15, wherein the thermal management system comprises a thermal management system housing having slots therein, wherein the slots are configured to allow ambient air to flow into and out of the lighting system when the plurality of synthetic jets is actuated.

21. A lighting system, comprising:

a light source;

a housing structure comprising a plurality of slots;

a plurality of synthetic jet devices, wherein each of the plurality of synthetic jet devices is configured to engage at least one of the plurality of slots in a point contact configuration comprising a plurality of contact points; and a heat sink having a base portion, a plurality of fins extending therefrom;

each of the plurality of synthetic jet devices being positioned between a pair of fins and configured to produce a unidirectional air flow through an air gap between the pair of fins.

22. The lighting system, as set forth in claim 21, wherein each of the plurality of synthetic jet devices is configured to engage two of the plurality of slots at respective contact points.

23. The lighting system, as set forth in claim 21, wherein the housing structure comprises a base bracket, and wherein the base bracket comprises the plurality of slots.

24. The lighting system, as set forth in claim 23, wherein the base bracket is a molded structure, and wherein the housing structure comprises the base bracket is molded therein.

25. The lighting system, as set forth in claim 21, comprising a bridge configured to engage each of the plurality of synthetic jet devices at an opposite side of the synthetic jet devices with respect to a base bracket.

26. The lighting system, as set forth in claim 21, wherein each of the plurality of slots comprises an adhesive gel therein.

27. A lighting system, comprising:

a housing structure;

a light source configured to provide illumination visible through an opening in the housing structure;

a thermal management system configured to cool the lighting system and comprising a plurality of synthetic jet devices secured within the housing structure in a point contact configuration comprising a plurality of contact points;

the thermal management system further comprising a heat sink having a base portion, a plurality of fins extending therefrom;

each of the plurality of synthetic jet devices being positioned between a pair of fins and configured to produce a unidirectional air flow through an air gap between the pair of fins; and, wherein the unidirectional flow of air comprises a first flow of cold ambient air flowing on one side of said thermal management system housing structure and flowing through said heat sink, between said fins, and a second flow of warm air flowing on a second side of said thermal management system housing structure and flowing from said heat sink and ejected into said ambient air; and driver electronics configured to provide power to each of the light source and the thermal management system.

* * * * *